United States Patent [19]

Hoyle et al.

[11] Patent Number: 4,850,450

[45] Date of Patent: Jul. 25, 1989

[54] LOGGING TOOL HOUSING WITH ACOUSTIC DELAY

[75] Inventors: David C. Hoyle, Houston, Tex.; Shu-Kong Chang, West Redding; Gyula Varga, Brookfield, both of Conn.

[73] Assignee: Schlumberger Technology Corporation, Houston, Tex.

[21] Appl. No.: 122,978

[22] Filed: Nov. 19, 1987

[51] Int. Cl.⁴ ............................................. G01V 1/40
[52] U.S. Cl. .................................... 181/102; 367/25; 181/400
[58] Field of Search ...................... 367/25, 31, 86, 911, 367/912, 178, 188; 181/102–106, 400; 166/66; 73/152

[56] References Cited

U.S. PATENT DOCUMENTS

| | | |
|---|---|---|
| 3,191,141 | 6/1965 | Schuster ................................ 367/25 |
| 3,191,142 | 6/1965 | Lebourg ............................... 367/25 |
| 3,191,143 | 6/1965 | Pardue .................................. 367/25 |
| 3,191,144 | 6/1965 | Pardue .................................. 367/25 |
| 4,020,452 | 4/1977 | Trouiller et al. ..................... 181/102 |

Primary Examiner—Brian S. Steinberger
Attorney, Agent, or Firm—Henry N. Garrana

[57] ABSTRACT

A housing for an acoustic logging tool apparatus for use in a well bore is disclosed. The logging tool comprises an acoustic transmitter and one or more acoustic receivers located a fixed distance from the transmitter and an elongated tubular housing having a transmitter area, an intermediate area and a receiving area. The tubular housing has a plurality of interruptions or holes in the longitudinal continuity of its wall to delay the acoustic energy passing from the transmitter to the receiver along the housing. The receiving area of the housing further having means for reducing secondary acoustic noise produced by acoustic scattering between the intermediate area and the receiving area.

20 Claims, 3 Drawing Sheets

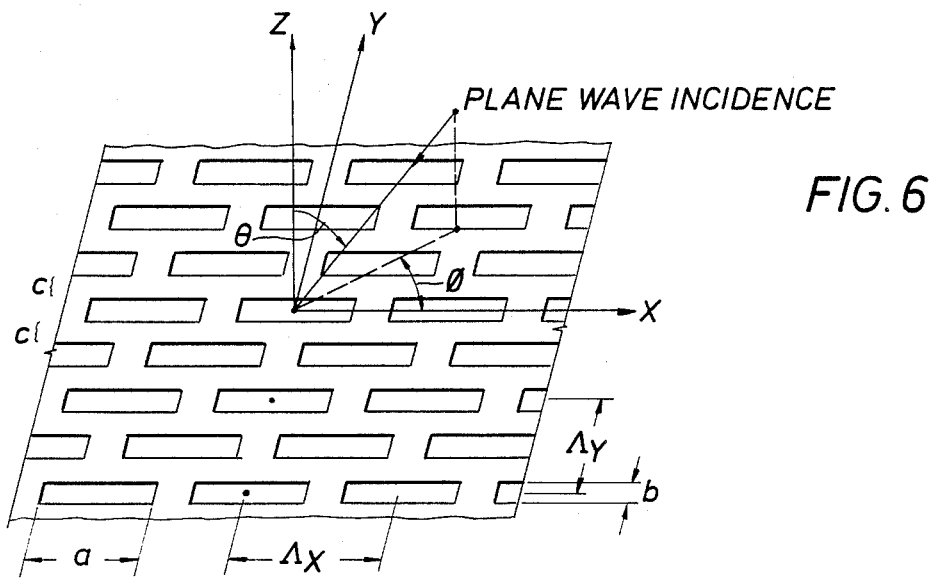
FIG. 6
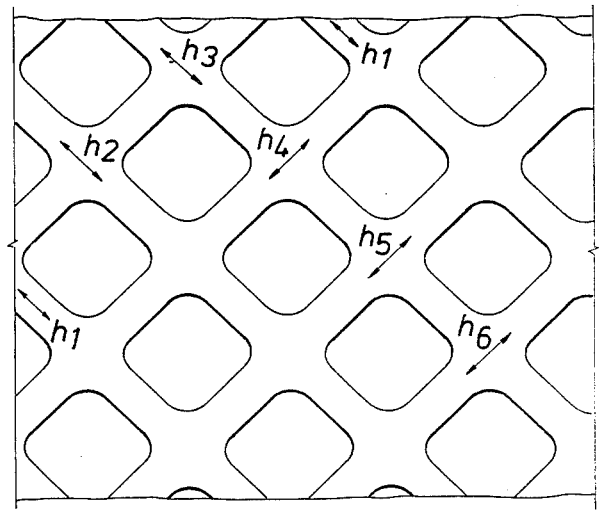
FIG. 7
FIG. 8
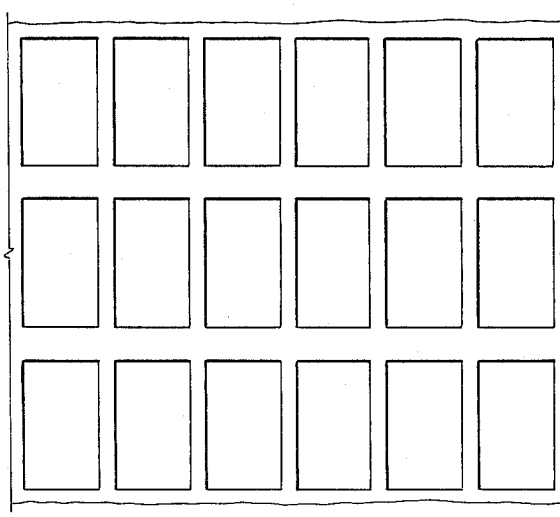
FIG. 9
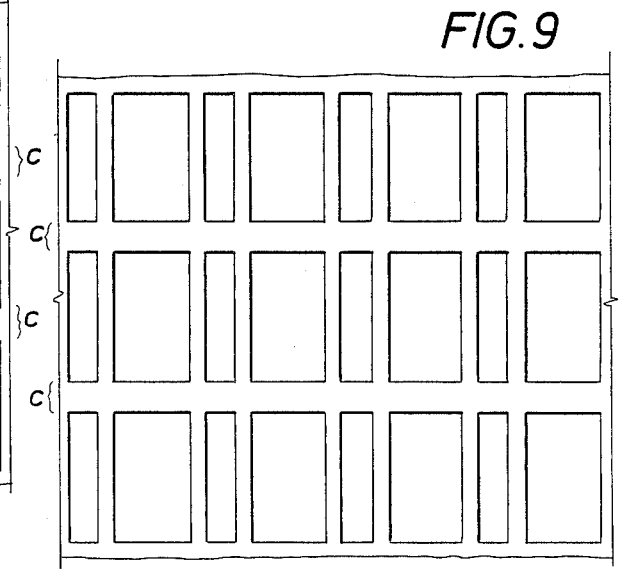

LOGGING TOOL HOUSING WITH ACOUSTIC DELAY

FIELD OF THE INVENTION

The present invention relates to exploratory tools for use in well bores and, more particularly, to acoustic well logging tools which probe the media surrounding a well bore with pulses of acoustic energy.

BACKGROUND OF THE INVENTION

An acoustic well logging tool is generally cylindrically shaped and suitably sized for passage through a fluid filled well bore. Normally, the tool carries two or more transducers which are disposed and secured at a fixed distance from one another. In a typical acoustic tool having three transducers, one of the transducers serves as a transmitter of sound waves while the remaining transducers serve as receivers of sound waves. The receivers are spaced from one another at a predetermined distance and are disposed to one side of the transmitter along the longitudinal axis of the tool. In operation, the transmitter in the tool is electrically actuated periodically to emit pulses of acoustic energy (or pressure waves) which propagate outwardly from the transmitter with a velocity dependent upon the media traversed by the energy. The arrival of the acoustic energy at the successively positioned receivers is detected to trigger electrical circuits in the tool which function to ascertain a characteristic of the formation from the pulse of acoustic energy traveling the predetermined distance between the two receivers.

Acoustic energy as discussed above can be generated or intercepted by piezoelectric, magnetostrictive or other transducers in a well known manner.

In a typical well bore, an acoustic tool is commonly spaced from the wall of the well bore so that the emitted acoustic wave energy or pressure pulses are first omnidirectionally transmitted through fluid (usually mud) in the well bore and, after traveling through the fluid over the distance from the tool to the wall of the well bore, a portion of the traveling wave energy is transmitted to adjacent media surrounding the well bore. The characteristic velocity of wave motion or the wave energy through the fluids in the well is generally in the neighborhood of 5000 feet per second, while the characteristic velocity of wave motion through the adjacent media may vary from 5000 feet per second to 25,000 feet per second for compressional waves depending upon the type of media encountered. Other wave types have similar properties.

The portion of the acoustic wave energy transmitted into the media generally travels at a higher velocity than the corresponding portion of the wave energy traveling in the well bore fluid. Because of this, the portion of the wave energy traveling through media reaches a receiver prior to the time that the portion of the acoustic wave energy traveling through the fluids does. It is this feature of higher media velocity which permits measurement of the velocity of acoustic energy in the media surrounding a well bore.

Typically, each pulse of acoustic energy upon intercepting a receiver transducer generates an electrical signal containing a number of undulations, cycles or vibrations. The parameter measurement is generally based upon the detection of a given portion or characteristic of an electrical signal developed at the respective receivers for a given traveling pulse of acoustic energy. A commonly used characteristic of a corresponding electrical signal for detecting purposes, for example, is a voltage amplitude value. This is made possible because the undulations, cycles or vibrations of a typical electrical signal as developed from a typical pulse of acoustic energy generally include, in the first cycle, a first peak of a given polarity followed by a second peak of an opposite polarity and approximately three times the magnitude of the first peak and, in the second cycle, a third peak with a polarity similar to the first peak and about ten times the magnitude of the first peak. Hence, when a selected characteristic voltage amplitude value is exceeded, a detection signal for operating the electrical circuits can be developed.

The characteristic voltage amplitude value selected for detection purpose is generally such that detection will occur during the first cycle of a signal. The selection of a voltage amplitude characteristic of a first cycle of the signal to detect the first arrival of the acoustic signal is desirable because the voltage amplitude values of subsequent cycles are generally distorted due to acoustic reflections in the borehole.

In other more recent developments, acoustic tools have been designed to measure and record high fidelity full acoustic waveforms, including compressional, shear and Stoneley waves from the first cycle for a preselected time. This type of full waveform logging demands even greater precision in the measurement circuits and greater isolation of the desired acoustic signal from sources of extraneous noise.

From the foregoing discussion, it is apparent that a suitable supporting means for the transducers must be capable of preventing passage of detectable acoustic energy longitudinally between the transducers at a velocity higher than that of the adjacent media surrounding the well bore. Obviously, if the supporting means are not so constructed, the receiver circuit would be triggered prematurely by the acoustic energy traveling through the support means thereby preventing the electrical circuit from obtaining a parameter measurement accurately related to the velocity of the adjacent media.

Additionally, the newer demands for acoustic logging tools for the receiving and recording of entire sonic waveforms during a logging run, which may be provided for each of a series (or array) of acoustic receivers on the acoustic logging tool, require that not only must the housing provide a desired acoustic delay time between the transmitter and receivers but the housing must also minimize any undesirable secondary acoustic energy (noise) produced by the housing about the receivers.

DESCRIPTION OF THE PRIOR ART

Heretofore, the housing provided for supporting and spacing the transducers from one another have had low strength characteristics and either a low velocity characteristic or an attenuating characteristic to suppress the amplitude of the energy. In other words, prior art housings have acoustically inhibited detectable acoustic energy from triggering the receiver circuitry prior to the earliest arrival of the desired acoustic signal (from the earth formations). However, these housings designed to meet acoustical inhibiting conditions for acoustically blocking the direct sound path have been complex and expensive to manufacture. Furthermore they have also been expensive to maintain and have had inadequate strength qualities for repeated, general field use.

Improvements to the housing or support means have increased both the housing strength and acoustic signal delay time. Such improvements include those shown in U.S. Pat. Nos. 3,191,141 issued to Schuster; 3,191,142 issued to Lebourg; and 3,191,143 issued to Pardue all on June 22, 1965. These patents are assigned to the assignee of this invention and incorporated herein by reference.

These prior art housing are generally referred to as slotted sleeves. The region from the transmitter to the receiver includes discontinuous circumferential slots which create a tortuous path for acoustic energy travelling longitudinally in the housing. Rectangular open rigs are also created in the housing adjacent the transmitters and receivers. Although the prior slotted sleeve housings succeeded in providing acoustic delays between the transmitter and receiver elements, they simultaneously provide detrimental acoustic reflections and other undesirable secondary acoustic energy or noise in the vicinity of the receivers.

The undesirable secondary acoustic energy, or noise, is developed primarily due to the discontinuous pattern formed in the housing section surrounding the receivers. Sound waves traveling along the tortuous path of the slotted sleeve housings develop reflected scatter patterns when interfacing with the change in pattern from the discontinuous slots to the open rectangular windows about or in the vicinity of the receivers. Additional noise is developed in the prior housings due to the "ringing" of the short cylindrical elements that make up the slotted sleeve. The noise produced inherently by the design of the prior slotted sleeve housings limits their effectiveness especially in full wave form logging operations.

IDENTIFICATION OF OBJECTS OF THE INVENTION

It is therefore an object of the present invention to provide a housing for an acoustic logging tool that provides an acoustic signal delay between the transmitter and receiver elements as well as minimizing the noise produced by the housing about the receivers.

Another object is to provide a housing having a continuous pattern about the receivers that minimizes ringing noise.

Other and further objects will be explained hereinafter and are more particularly delineated in the appended claims.

SUMMARY OF THE INVENTION

In summary, however, from one of its broad aspects, the invention contemplates a new and improved housing for an acoustic logging tool used for protecting the transmitter(s) and receiver(s) of the logging tool. The housing has a plurality of interruptions in the longitudinal dimension of its wall to delay the acoustic energy coupled from the transmitter(s) to the receiver(s) along the housing. The housing further includes means in the vicinity of the receiver(s) for reducing secondary acoustic noise produced by acoustic scattering in the vicinity of the receiver(s). Preferred details and structures are hereinafter more particularly described.

BRIEF DESCRIPTION OF THE DRAWINGS

The invention will now be described with reference to the accompanying drawings in which:

FIG. 6 is an unwrapped cylindrical sectional view of the outer cylindrical surface of a portion of the tool shown in FIG. 1 in the vicinity of the receivers developed in the plane of the drawing;

FIG. 7 shows an unwrapped cylinder section, similar to FIG. 6, showing the double-helix diamond pattern section of the sleeve of FIG. 3;

FIG. 8 shows an unwrapped cylinder section, similar to FIG. 6, of an alternative minimum metal pattern; and FIG. 9 shows an optional alternative minimal metal pattern similar to FIG. 8.

DESCRIPTION OF THE INVENTION

Figure 1:
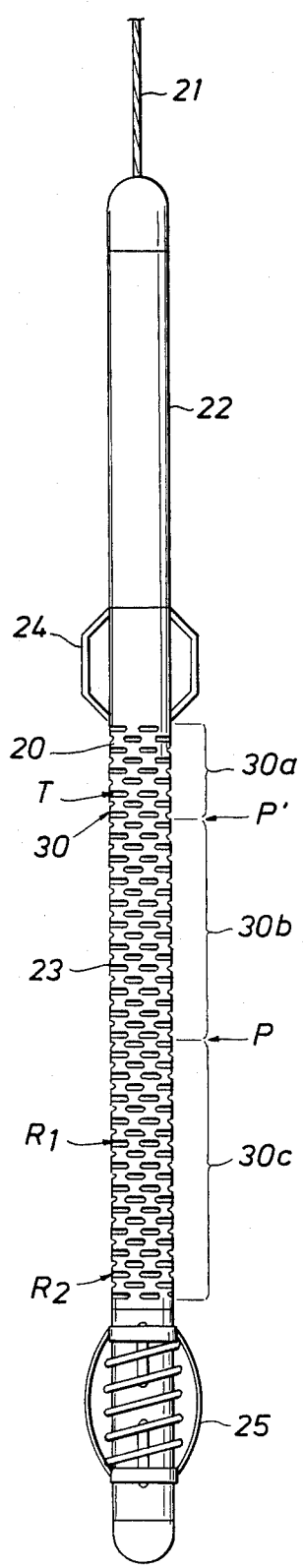
FIG. 1 is a view of an acoustic logging tool of the present invention.

In accordance with the present invention, a first requirement for reducing the characteristic velocity of a length of a tubular support constructed of steel is to substantially eliminate any direct linear path longitudinally of the tubular support and to provide an acoustic interference pattern lengthwise of the housing. Stated another way, the longitudinal continuity of the tubular support must be substantially interrupted or disrupted so that tortuous acoustic paths are formed. However, the interruption is such that there are remaining longitudinal interconnecting ties which prevent substantial longitudinal and lateral flexing of the tubular member. The tortuous path effectively lengthens the distance that acoustic energy must follow and also affects the mechanical characteristics of a support by decreasing the longitudinal unit spring rate of the support and its weight per unit length. Another simple solution is to suspend the transmitter above the receiver section, such as by a cable, with the possible use of additional acoustic suppression means on the intervening cable. Even with the suspended receiver section surrounded by a rigid protective housing, that housing will receive some of the acoustic energy from the transmitter, which will produce undesirable secondary scattering near the receiver(s) although the cable may produce sufficient slowness. Thus the transmitter-cable-receiver housing system does provide the desired delay (although lacking rigidity for deviated hole logging, etc . . . ) does meet the first condition of a housing with acoustic delay.

A second requirement for the present invention is to provide a housing that does not have substantial undesirable secondary acoustic energy (noise) emitted by the housing in the vicinity of the receivers in response to a transmitter firing. Such noise is produced by acoustic scattering in the housing.

The pattern or configuration of cuts in the housing between the transmitter and each receiver, therefore, must be designed to delay the acoustic signal traveling along the housing from the transmitter to the receiver so that the first acoustic arrival will be based on characteristics of the borehole formation rather than the housing. This is useful for standard "first motion" acoustic logging operations. The concern for reduction of housing noise in the vicinity of the receivers, the design requirement, is more important when full waveforms are measured, since the noise will create errors in the measured waveforms. The use of full waveforms is well known, as disclosed in U.S. Pat. Nos. 4,210,965; 4,210,966; and 4,210,967 issued to Ingram on July 1, 1980.

It is therefore necessary to design a housing having two distinct properties. The first property is a preselected delay time for the housing conveyed, transmitter generated signal to reach each receiver. The second property is the minimization of undesirable secondary acoustic signals or noise generated in and by the housing in the vicinity of the receivers. The first property has been the subject of prior patents. Various tortuous path patterns may be and have been developed in accordance with the present invention based on the signal frequency and minimum or preselected signal delay desired. The second required property, minimizing housing noise in the vicinity of the receivers provides for very different considerations.

The present invention involves an elongated and generally cylindrical housing for an acoustic of "sonic" logging tool which is to be used in a well bore containing a well fluid. The tool is adapted to be passed through the well bore by means of an armored electrical cable spooled on a surface-located winch and is electrically coupled to surface indicating and recording units.

Figure 2:
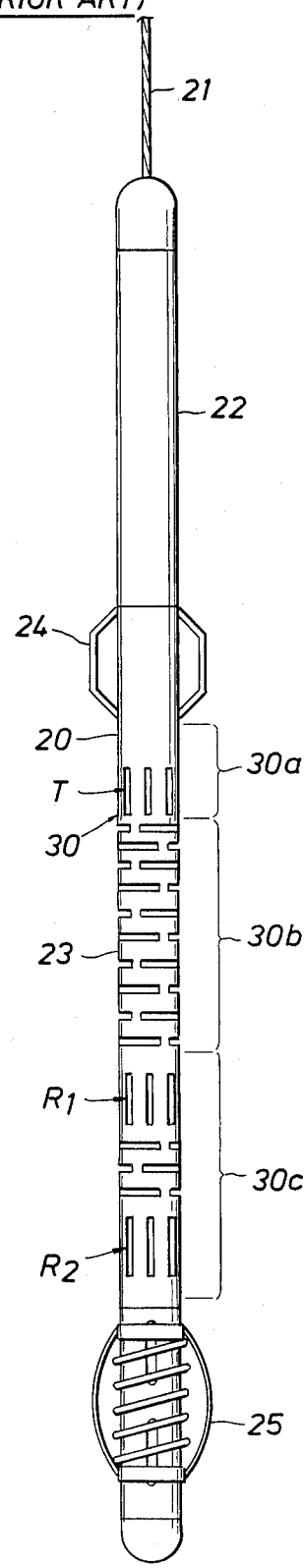
FIG. 2 is a view of a prior art acoustic logging tool.
Figure 3:
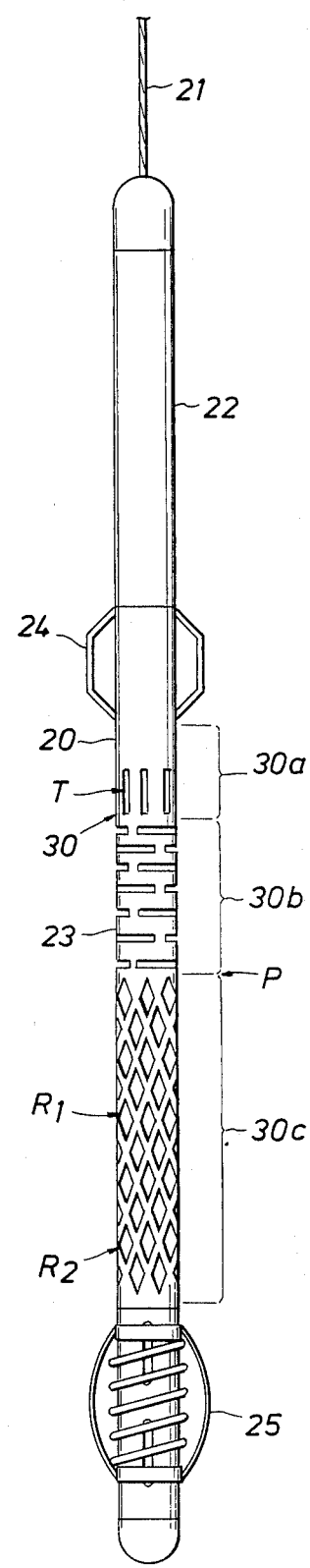
FIG. 3 is a view of an alternative acoustic logging tool of the present invention.

Referring now to FIGS. 1-3, wherein like numerals describe like parts, FIG. 1 shows a preferred mode of the present invention, FIG. 2 shows a standard prior tool and FIG. 3 shows an alternative mode of the present invention. Prior to an analysis of the noise suppression design characteristics of a housing of the present invention specific examples of preferred modes are shown.

In FIG. 1 there is illustrated an elongated but rigidly constructed acoustic logging tool 20 adapted for passage through a well bore (not shown) by means of an armored electrical cable 21 and winch (not shown) which is situated at the earth's surface. The tool 20 includes an upper, tubular cartridge 22 and a lower, tubular housing 23, both of which are preferably constructed of steel. A single centralizer support device 24 disposed at the center of gravity of the tool 20 may be employed if the tool is to be centered in a well bore. Alternatively, two or more centralized supports disposed along the length of the tool may be employed if so desired. Also, if desired, a caliper device 25 for measuring the diameter of the well bore, or other similar secondary devices, may be coupled to the tool 20, for example, at its lower end as shown in the drawing.

A coaxially disposed mandrel (not shown) supports transmitter and receiver transducers mounted thereon in a preselected fixed spaced relationship. The housing 23 surrounds the mandrel and the transducers mounted on the mandrel.

Within the upper cartridge 22 are electronic components and circuits to periodically actuate a transmitter T and to perform the measuring function in response to signals from the receivers $R_1$ and $R_2$. The transmitter T and receivers $R_1$ and $R_2$ are generally mounted in a fixed spaced relationship on a rigid mandrel with the transmitter T, receivers $R_1$ and $R_2$ and supporting mandrel all surrounded by the protective housing 23. For simplicity, one transmitter and two receivers are indicated. However acoustic tools often use multiple transmitters and receivers, and such arrays of transducers are, as such, contemplated.

The electronic circuits of cartridge 22 are coupled via cable 21 to conventional surface indicating and recorder instruments (not shown). Briefly, the time measuring function may be accomplished by circuits as well known in the art such as shown in U.S. Pat. No. 3,191,141 wherein a keying circuit periodically triggers the transmitter T to emit a pulse of acoustic energy. The keying circuit also determines the period during which each receiver $R_1$ and $R_2$ are activated to receive acoustic signals. This has been used to provide first arrival time determinations. Permitting the receivers $R_1$ and $R_2$ to continue receiving acoustic signals after the first arrival permits sensing of full acoustic wave forms. Such received signals are transmitted up the cable 22 for recording as acoustic logs.

The lower, tubular housing 23 includes three illustrative housing sections identified by the number 30 and differentiated from one another by the letters a, b, and c. Housing sections 30a (transmitter), 30b (intermediate) and 30c (receiver) acoustically separate the transducers (transmitter T and receivers $R_1$ and $R_2$) from each other by the acoustic transmission response of the housing sections identified. The receiver housing section 30c extends above the receiver $R_1$ and below the receiver $R_2$ to fully extend in the entire vicinity of the receivers. More clearly described, the pattern of the receiver section extends from a longitudinal point (P or $P^1$) between the transmitting area and the receiving area (such as at the beginning point of the receiving area.

In general, each housing section 30 is constructed and arranged to permit and to facilitate the travel of acoustic energy in a generally radial pattern between a transducer within the tubular housing and the drilling fluids or muds (not shown) in the well bore which are exterior of the transducers. Also, in general, each housing section 30 is constructed and arranged so as to increase the apparent time required for detectable energy to travel over the portions of the housing between the transducers.

Each housing section 30 is constructed and arranged to provide void spaces about the periphery and along the length of the housing 23 which form a generally tortuous longitudinal path from transmitter to receiver. Alternatively, intermediate housing section 30b located between the transmitter T and the receiver section 30c may involve another acoustic delay or suppression means, as by a cable with or without additional acoustic suppression or damping means. The acoustic signal transmitted from the transmitter, along the cable to and along the receiver section housing is therefore defined as being for this invention simply another tortuous path between the transmitter and receivers. Therefore it simply is treated under this invention as an intermediate housing with an acoustic delay pattern. Hence, acoustic wave transmission lengthwise of the housing occurs by traveling tortuous paths which extend longitudinally along the housing 23 and which are greater than the straight line distance between a successive pair of points. This arrangement provides the desired acoustic delay for the housing 23.

The tool housing 23 is also constructed to minimize secondary acoustic noise generation in the vicinity of the receivers $R_1$ and $R_2$. More specifically, as shown in FIGS. 1 and 3, the receiver housing section 30c exhibits a characteristic pattern which prevails over the entire length of the lower housing in the vicinity of or about the receivers $R_1$ and $R_2$. A preferred pattern, shown in FIG. 1, shows a single continuous pattern extending from the transmitter T to a point past the end of the last receiver. This pattern on the housing sections 30a, b and c provides both a delay in arrival time of the acoustic signal generated by transmitter T that is conveyed along the housing 23 as well as minimization of acoustic static or noise produced by the housing in the vicinity of the receivers that would distort the full acoustic waveforms.

Alternatively, as shown in FIG. 3, an intermediate housing section 30b with an excellent acoustic delay pattern may separate the transmitter T from the receiver section 30c, while a continuous pattern is provided on receiver housing section 30c with an acoustically transparent or non-static forming configuration.

In comparison, prior tools as shown in FIG. 2 provide acoustic sections 30a, 30b and 30c respectively about the transmitter T, between the transmitter T and the receiver $R_1$ and between the receivers $R_1$ and $R_2$. However, a discontinuous open slotted pattern (windows) surrounds the receivers $R_1$ and $R_2$ and the transmitter T. Although the housing sections 30b and 30c delay the acoustic pulse along the housing 23 from the transmitter T to the receivers $R_1$ and $R_2$, the discontinuity in the pattern of the acoustic inhibiting section 30c around the receivers $R_1$ and $R_2$ created by the window-slot-window pattern provides an undesirable acoustic noise signal that may be received by the receivers $R_1$ and $R_2$ especially during full acoustic waveform logging. More specifically, the discontinuous pattern or pattern change from the intermediate section 30b to the receiver section 30c and the discontinuities within the receiver section 30c produce an acoustic scattering that is received as acoustic noise in the vicinity of the receivers.

Figure 4:
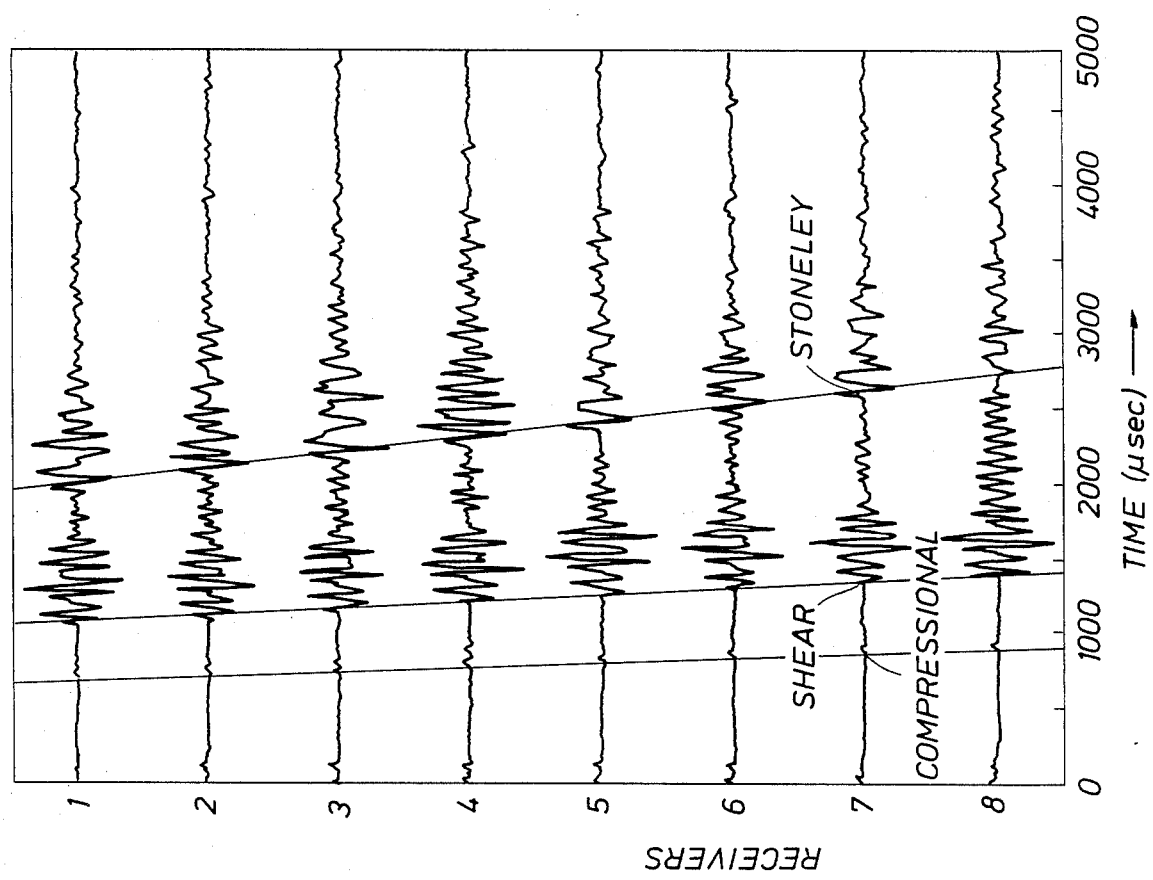
FIG. 4 shows a full waveform, high fidelity acoustic log obtained from an acoustic logging tool with the prior art housing of FIG. 2.

More particularly, specific logging runs show the effects of this secondary acoustic noise. FIG. 4 shows a section of an acoustic logging run using a prior housing of the type shown in FIG. 2. The logging tool, having an array of eight spaced receivers was tested at a borehole depth of 3100 feet. The waveforms contain the expected compressional, shear and Stoneley waves. However, the shape of the Stoneley arrival varies widely from receiver to receiver. This variation is due in large part to the noise produced by the housing in the vicinity of the receivers. Additionally, in a soft formation a phantom "secondary Stoneley" wave appears to be received (not shown), arriving between the compressional and Stoneley wavelets. This "secondary Stoneley" is believed to be the result of coherent scattering of the compressional wave from the discontinuous pattern of the prior tool housing.

Figure 5:
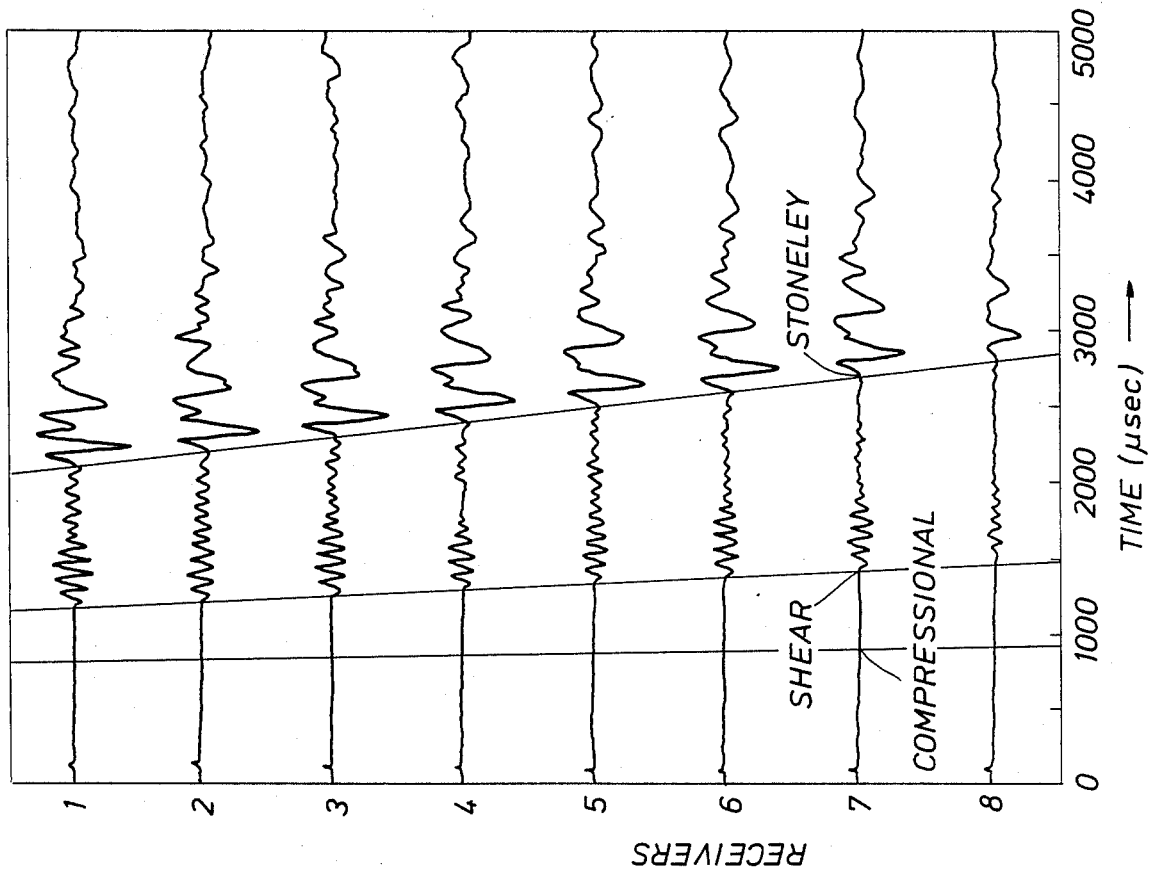
FIG. 5 shows a log similar to FIG. 4, for an acoustic logging tool with the housing of FIG. 1.

For comparison, an array of waveforms from an eight receiver array tool having the housing of FIG. 1 at the same depth and in the same hole is shown in FIG. 5. The coherence of the waveforms is far superior across each of the receivers in the array showing only amplitude degradation over distance as expected. Additionally, no phantom signals are developed in soft formations by the tool housing. The housing shown in FIG. 1 therefore substantially eliminates the noise that is produced by the prior art housing designs.

Thus a characteristic feature of this novel housing according to the present invention must have a receiver section having a continuous pattern. The preferred housings shown in FIG. 1 and 3 meet this requirement as they have receiver sections 30c that have a single continuous pattern longitudinally about the tool. The prior tools (as FIG. 2) have discontinuous patterns (such as provided by the "windows" over the receivers $R_1$ and $R_2$ separated by a standard slotted section) in the receiver sections, thus producing secondary noise.

Numerous patterns can be used in the vicinity of the receivers so long as the pattern is longitudinally continuous. FIG. 6 shows the outer surface of a portion of the housing of FIG. 1 in the vicinity of the receivers (30c) developed in the plane of the drawing. For simplicity, this is referred to as the "unwrapped" pattern of the housing of FIG. 1. FIG. 6 shows an interleaved or "brick work" pattern of slots (holes) cut into the wall of the housing. It has been found that specific dimensions of the patterns provide better properties at the scattering of the acoustic waves is a function of (1) acoustic frequency (2) vertical incidence angle of the acoustic energy $\theta$ (3) the azimuth incidence angle $\phi$ (4) the hole length a and (5) the hole aspect ratio (hole height/length) b/a. Thus the pattern of the receiver section 30c of the housing 23 is subject to suitable design criteria depending on the five above noted functional variables.

Eight specific design criteria are contemplated for the preferred housing of the invention. The first two relate to general acoustic logging tool housings. The latter six become apparent from comparison testing. Although a housing of the present invention should maintain the first two design criteria, as will be seen, some of the latter criteria may be ignored. However, it is a requirement of the invention to have a continuous pattern in the vicinity of the receivers, with the most preferred sonde housing generally meeting all of the following design requirements:

1. The housing must be acoustically slow overall in the frequency range of interest; it is desirable for structure borne noise to propagate at approximately the velocity of the borehole fluid, about 200 $\mu$sec/ft, or to propagate more slowly than the slowest Stoneley wavespeed of interest, i.e., at approximately 400 $\mu$sec/ft.

2. Structurally, the housing must maintain straightness of the receiver array, and maintain centering of the array in vertical and deviated boreholes. The housing must also protect the fragile receivers from damage during handling and in the borehole, and provide fishing strength and rigidity to the sonde.

3. The periods between perforations in the axial and circumferential directions should be less than approximately $\frac{1}{2} \Lambda_{min}$ (the smallest signal wavelength of interest or received by the receivers in the borehole fluid—approximately 4 inches, at 15 kHz in water) to prevent acoustic scattering by the housing.

4. The periods between perforations in the axial and circumferential directions should be smaller than $\Lambda_{min}$ for maximum power transmission through the housing.

5. For perforations smaller than $\Lambda_{min}$ power transmission is proportional to hole area. Thus, to obtain maximum transmission of acoustic energy through the housing the housing should be as open as possible.

6. The axial period between perforations should be very small compared to $\Lambda_{min}$ to prevent mode coupling with the borehole Stoneley wave from occurring in the frequency range of interest. By following this guideline perturbation of the Stoneley velocity is also minimized.

7. The height of any circumferential ring like segments in the housing should be less than $\Lambda_{min}/6$ to prevent cavity mode resonances of segments from occurring in the frequency range of interest.

8. To eliminate hoop resonance noise, create no circumferential ring like element.

These design criteria, may not be met for any specific sonde housing. The specific environmental and frequency constraints will determine the design constraints used on any particular sonde housing of the present invention.

As comparison examples, FIGS. 7-9 show various other unwrapped patterns of receiver area housing sections, although other patterns including continuous patterns of circles, ovals and other repeated patterns of holes cut out or otherwise embossed into the housing are contemplated. Modern metalworking and cutting techniques, including the use of high energy cutting lasers has permitted the cutting of holes in the metal housings to provide almost any pattern of holes. FIG. 7 shows a preferred pattern, specifically a double-helix diamond pattern, as shown about the receivers $R_1$ and $R_2$ in FIG. 3, which may be cut by a laser. As previously noted, this diamond pattern may extend over any portion, including the entirety, of the housing 23 so long as the pattern extends continuously over the housing in the vicinity of the receivers.

The double-helix diamond pattern is so named due to the formation of two opposing sets of three helixes on the tube axis, shown by lines $h_1$ through $h_6$. Such helixes form a set of interleaved holes in the housing. Specific physical measurements for a housing laser cut from 3.625 O.D. × 3.03 I.D. stainless steel stock for an acoustic tool with a 2-15kHz acoustic critical range are:

Axial period between windows in phase with each other = 3.0";

3 windows per row, 120° apart; windows in adjacent rows offset by 60°;

helix angle from axis=43.39°;

axial window length=1.836";

radius on longitudinally oriented corners of windows=0.45"; and radius on circumferential oriented corners of window—0.25".

The axial uniformity of the helix pattern (versus the alternating transverse slots and longitudinal windows of the prior FIG. 2 or other-preferred (FIG. 1) mode housings) minimizes acoustic reflections along the housing, helping to maximize acoustic waveform coherence. The 3.0 inch axial period causes waveform frequency distortion to occur at twice the frequency of prior housings having the usual 6.0 inch periods.

Additionally, the absence of periodic ring like elements (found in both the FIGS. 1 and 2 housings and noted at "c" in FIG. 6, 8, and 9) reduces waveform distortion caused by the resonant vibration (ringing) of such elements. Also, the high average openness (less metal coverage) over the receiver array is beneficial because borehole modes are suppressed and attenuated; i.e. providing better transmission from the borehole of acoustic signals.

Another configuration of the housing can be seen in FIG. 8. This pattern is referred to as the "minimum metal" pattern as it has a very high average openness and reduces therefore the amount of metal in the sleeve between the formation and the receivers. Additionally, as the holes are linearly patterned, not interleaved, no acoustically delaying tortuous paths are created. Proper sizing of the holes or slots, however, according to the remaining design parameters provides an excellent housing for acoustical tools. For an acoustic tool with a 2-15kHz critical range, the size parameters are:

axial length of windows=2.5";

6 windows per row, 60° apart;

window width=47.67°;

axial period between windows=3.0"; and corner radius=0.25".

An optional minimum metal pattern is shown in FIG. 9. The difference in pattern being in the size of the holes along the circumference alternating wide and narrow holes. Larger holes being useful, for example, to provide a greater openness about the receivers. Nearly any ratio of widths for large to narrow holes may be used subject to the noted design criteria. Thusly various sized holes can be placed in the pattern (there is no requirement that all holes or metal remaining be of a single size) as long as the pattern is longitudinally continuous in the vicinity of the receivers.

Obviously, any particular housing may not follow all of the noted design criteria. The table below shows a comparison of patterns of the present invention for the receiver sections shown in FIGS. 6, 7, 8 and 9 in relation to the eight noted design criteria:

TABLE

| Design Criteria: | Rectangular (FIG. 6) | Diamond (FIG. 7) | Minimum Metal (FIG. 8 & 9) |
|---|---|---|---|
| 1. Slowness: | Yes | Acceptable | No |
| 2. Structural Strength: | Yes | Yes | Yes |
| 3. Periodicity ($\frac{1}{4}\Lambda_{min}$) for scattering: | Yes | Acceptable | Yes |
| 4. Periodicity ($\Lambda_{min}$) for Power: | Yes | Yes | Yes |
| 5. Open as much as possible: | Acceptable | Yes | Yes |
| 6. Periodicity ($<<\Lambda_{min}$) for Stoneley mode coupling: | Yes | Yes | Yes |
| 7. Height of ring like elements ($<1/6\Lambda_{min}$) for cavity mode: | Yes | Yes (no rings) | Acceptable |
| 8. Absence of ring like elements for hoop mode: | No | Yes | No |

Thus it can be seen that the specific design of any particular housing will depend on the expected borehole environment, frequency range of interest and the specific trade-offs between desired noise reductions. Additional combinations, such as providing an intermediate area of high slowness (FIG. 6) with a receiving area having other desired characteristics (i.e. FIG. 7), such as in the FIG. 3 housing, will minimize the negative aspects of a single pattern housing (as FIG. 1). Such a combination would be necessary with the minimum metal patterns to provide the necessary overall housing slowness required by the first design criteria.

Further modifications will also occur to those skilled in the art, and such are considered to fall within the spirit and scope of the invention as defined in the appended claims.

What is claimed is:

1. Housing apparatus for supporting and protecting a transmitter transducer and at least one receiver transducer disposed within an acoustic well logging tool, comprising:

an elongated tubular member having a wall and including a transmitting area, and a receiving area, said transmitting area of said member enveloping said transmitter transducer, said receiving area enveloping said receiver transducer, said tubular member including a plurality of interruptions disposed along a longitudinal continuity of the wall for delaying acoustic energy passing from said transmitter transducer to said receiver transducer, the interruptions along the receiving area of said tubular member defining a preselected continuous pattern extending from a beginning of said receiving area to an end of said receiving area for reducing secondary acoustic noise generation about said receiver transducer, wherein said preselected continuous pattern is a diamond double helix.

2. The housing apparatus of claim 1 wherein said tubular member comprises an intermediate area between the transmitter area and the receiver area.

3. The housing apparatus of claim 2 wherein said intermediate area includes a preselected continuous pattern of interruptions which are substantially identical to the continuous pattern of interruptions present in the wall of said tubular member associated with the receiving area.

4. The housing apparatus of claim 3 wherein said interruptions extend along substantially an entire longitudinal length of said tubular member, said interruptions being said preselected continuous pattern.

5. Housing apparatus for supporting and protecting a plurality of receivers of an acoustic well logging tool, comprising:
an elongated tubular member having a wall, the wall of said member surrounding said receivers and extending longitudinally over all of said receivers, the wall of said member including a plurality of interruptions defining a preselected longitudinally continuous pattern, said continuous pattern of interruptions reducing secondary acoustic noise generation about said receivers, wherein said tubular member includes a plurality of ring-like segments interleaved with a respective plurality of said interruptions around said receivers.

6. The housing apparatus of claim 5 wherein said plurality of interruptions in the wall of said tubular member delays acoustic energy passing longitudinally along the length of the housing.

7. The housing apparatus of claim 5 wherein a plurality of signal wavelengths are received by said receivers, one of said plurality of signal wavelengths being a smallest signal wavelength relative to the other of said signal wavelengths, a period between said interruptions in an axial direction being less than said smallest signal wavelength received by said receivers.

8. The housing apparatus of claim 7 wherein a period between said interruptions in a circumferential direction is less than said smallest signal wavelength received by said receivers.

9. The housing apparatus of claim 8 wherein the periods between said interruptions in the axial and circumferential directions are less than one half of said smallest signal wavelength received by said receivers.

10. Apparatus for use in a well bore, comprising:
acoustic transmitter means;
acoustic receiver means located in fixed spaced relationship relative to said acoustic transmitter means; and
an elongated tubular member surrounding said acoustic transmitter means and said acoustic receiver means, said tubular member including a transmitting area, an intermediate area and a receiving area, each said area of said tubular member including a plurality of longitudinal interruptions disposed through a wall of said tubular member for delaying acoustic energy originating from the transmitter means and passing to the receiver means via the areas of said tubular member,
the longitudinal interruptions disposed through the wall of said tubular member in said receiving area having a preselected continuous pattern for reducing secondary acoustic noise of acoustic scattering between said intermediate area and said receiving area wherein said preselected continuous pattern comprises interleaved slots.

11. Apparatus as claimed in claim 10 wherein said preselected continuous pattern has a preselected periodicity.

12. Apparatus as claimed in claim 11 wherein the pattern and periodicity of said interruptions in the receiving area is dissimilar to the pattern and periodicity of said interruptions in the intermediate area of said tubular member.

13. Apparatus as claimed in claim 11 wherein the pattern and periodicity of said interruptions in the receiving area is similar to the pattern and periodicity of said interruptions in the intermediate area of said tubular member.

14. Apparatus as claimed in claim 13 wherein the pattern and periodicity of said interruptions in the receiving area is the same as the pattern and periodicity of said interruptions in the intermediate area of said tubular member.

15. Apparatus as claimed in claim 11 wherein said interruptions in the receiving area of said tubular member form a preselected continuous pattern of holes disposed through the wall of said tubular member surrounding the acoustic receiver means.

16. Apparatus as claimed in claim 15 wherein a plurality of signal wavelengths are received by said receiver means, one of said plurality being a smallest signal wavelength relative to the other of said signal wavelengths, the periods between the interruptions in an axial and a circumferential direction are less than said smallest acoustic signal wavelengths in the wellbore.

17. Apparatus as claimed in claim 16 wherein the periods between the interruptions in the axial and circumferential directions are approximately one-half of said smallest acoustic signal wavelength in the wellbore.

18. Apparatus as claimed in claim 17, wherein the periods between the interruptions in the axial and circumferential directions are less than one-half of said smallest acoustic signal wavelength in the wellbore.

19. Apparatus as claimed in claim 10 wherein a velocity at which said acoustic energy passes from said transmitter means to said receiver means along said tubular member is approximately equal to an acoustic velocity of a fluid in said wellbore.

20. The housing apparatus of claim 5, wherein said ring-like segments are disposed at varying heights along a longitudinal axis of said tubular member, a particular one of said ring-like segments being disposed at a maximum height along said longitudinal axis, the maximum height of the particular ring-like segment in said tubular member being less than one-sixth of a signal wavelength received by said receivers.

* * * * *